United States Patent [19]

Nozaki

[11] 3,914,391

[45] Oct. 21, 1975

[54] PREPARATION OF HPd(CN)$_3$
[75] Inventor: Kenzie Nozaki, St. Louis, Mo.
[73] Assignee: Shell Oil Company, Houston, Tex.
[22] Filed: Mar. 26, 1973
[21] Appl. No.: 344,680

[52] U.S. Cl. ............................................... 423/364
[51] Int. Cl.$^2$ ............................................. C01C 3/00
[58] Field of Search ........... 423/364, 369, 379, 372; 260/2.2 R

[56] References Cited
UNITED STATES PATENTS
1,573,732  2/1926  Metzger .............................. 423/379
2,900,353  8/1959  Cassidy et al. .................... 260/2.2 R
3,501,265  3/1970  Sullivan ............................. 423/364

FOREIGN PATENTS OR APPLICATIONS
250,453  4/1926  United Kingdom................ 423/372

OTHER PUBLICATIONS
Jacobson: Encyclopedia of Chemical Reactions, Vol. V (1953), p. 307.

Primary Examiner—Earl C. Thomas

[57]  ABSTRACT

A novel palladium-containing compound, HPd(CN)$_3$, and its preparation are described. This compound is particularly useful as a catalyst for the copolymerization of carbon monoxide and ethylenically unsaturated monomers such as ethylene.

7 Claims, No Drawings

PREPARATION OF HPD(CN)$_3$

BACKGROUND OF THE INVENTION

Cyano-containing compounds of palladium and their preparation, are generally known. See, for example, the preparation of $H_2Pd(CN)_4$ by reacting $K_2Pd(CN)_4$ with concentrated HCl [D. F. Evans et al, *J.C.S.* 3167 (1964)]. It is also known that $Pd(CN)_2$ is an effective catalyst for preparing ethylene-carbon monoxide copolymers. See, for example, U.S. Pat. No. 3,530,109.

SUMMARY OF THE INVENTION

A new and useful palladium compound has now been prepared which is especially suitable for the preparation of copolymers of ethylene-carbon monoxide copolymers. Accordingly, the present invention is directed to HPd(CN)$_3$ as a novel composition of matter. The present invention is further directed to processes for preparing HPd(CN)$_3$.

The use of this novel compound as a catalyst for polymerizing carbon monoxide with at least one other ethylenically unsaturated copolymerizable monomer such as ethylene, is the subject matter of copending patent application, Ser. No. 344,679, filed Mar. 26, 1973, now U.S. Pat. No. 3,835,123, issued Sept. 10, 1974.

DESCRIPTION OF THE PREFERRED EMBODIMENTS

It has been found that the present novel compound, HPd(CN)$_3$, is prepared by several methods.

One method for preparing HPd(CN)$_3$ comprises (1) contacting Pd(CN)$_2$ with an aqueous solution of HCN in molar excess for a time and temperature sufficient to effect reaction, (2) evaporating the resulting reaction mixture to dryness under reduced pressure at a temperature of from about 0° to 40°C, and preferably about 20°–30°C, and (3) recovering the white, water soluble HPd(CN)$_3$ residue.

In general, Pd(CN)$_2$ is treated with molar excess of an aqueous solution of HCN for a time varying from few minutes to several days at temperatures ranging from about 0°C to 100°C. Preferably, the reaction is performed at temperatures from about 70°C to 90°C for periods ranging from about ½ to 5 hours. It will be appreciated that lower temperatures are generally associated with longer reaction times and higher temperatures typically allow much shorter reaction times.

As stated hereinbefore, the HCN is utilized in molar excess and as an aqueous solution. A 100 to 500% stoichiometric excess is usually adequate, however, a greater or lesser excess may be employed as desired. In general, the HCN is employed as a 1 to 10% aqueous solution. A very suitable reaction procedure comprises reacting Pd(CN)$_2$ with a 200% excess of a 5% aqueous solution of HCN for 1–3 hours at 70° to 90°C.

After the desired reaction is completed, reaction product is recovered by evaporating the solution to dryness under reduced pressure, i.e., a pressure less than atmospheric. The water and excess HCN is thereby removed under applying reduced pressure, i.e., a vacuum of less than about 10 mm of mercury at temperatures of about 25°C. The resulting product is an essentially pure, water-soluble, white powder having an elemental analysis of HPd(CN)$_3$.

Another method for preparing HPd(CN)$_3$ comprises (1) contacting an aqueous solution of $K_2Pd(CN)_4$ with a conventional acid-type cation exchange resin in the acid form, (2) evaporating the resulting solution to dryness at reduced pressure at a temperature of about 0° to 40°C and (3) recovering the white, water-soluble HPd(CN)$_3$ residue.

The choice of any particular cation exchange resin forms no part of the instant process and any cation exchange resin is suitable for use in the instant method so long as it is in the "acid form". Cation exchange resins are well-known and are commercially available from a number of manufacturers under a multitude of trade designations. For a more detailed description of the theory, preparation and regeneration of cation exchange resins, see "Ion Exchange", Helfferich, McGraw-Hill Book Company, Inc. (1962), particularly pages 29–47, and "Ion Exchange Resins" Kunin, John Wiley and Sons, Inc., Second Edition (1958), particularly pages 82–97.

As noted hereinbefore, any cation exchange resin can be employed in the instant process; however, excellent results are obtained when the cation exchange resin is a sulfonic acid cation resin, a carboxylic-type cation resin, a sulfonated phenolic cation resin, a carboxylic sulfonic resin or the phosphoric, phosphonic and phosphorus acid resins and aluminum silicate resins. All these types are commercially available. For a list of the major commercially available cation exchange resins, see Ion Exchange Resins, Kunin, John Wiley and Sons, Inc., Second Edition (1958), Table 13. In addition, the patent literature is replete with descriptions of the preparation of suitable cation exchange resins. See, for exchange, U.S. Pat. Nos. 2,860,109; 2,877,191; 2,885,371; 2,891,014; 2,898,311; 3,030,317; and 3,275,575, among many others.

An aqueous solution of $K_2Pd(CN)_4$ is contacted with a suitable cation exchange resin for a period of time which is sufficient to exchange the $K^+$ ion for the $H^+$ ion. In general, a 1 to 25% by weight aqueous solution of $K_2Pd(CN)_4$ solution is contacted with the cation exchange resin for 1 to 24 hours at temperatures from about 10° to 100°C for ½ to 10 hours.

The resulting solution is subjected to reduced pressure and all the water and volatile material removed as hereinbefore described. The resulting product is a water-soluble, white powder analyzed as HPd(CN)$_3$.

It is extremely relevant that it is essential, even critical, to perform the evaporation step under reduced pressure (in vacuo) at a temperature between about 0°C and 40°C in order to prepare HPd(CN)$_3$. At temperatures above about 40°C, the resulting product is a mixture of HPd(CN)$_3$ and other Pd-compounds. It is believed that the other Pd-compound is essentially Pd(CN)$_2$.

It will be further appreciated that at temperatures above about 40°C, i.e., from about 40°–90°C, the resulting residue comprises a mixture of HPd(CN)$_3$ and Pd(CN)$_2$. However, this mixture is a more effective catalyst than Pd(CN)$_2$ alone, i.e., the yield of polymer per gram of catalyst is higher. Also, copolymers of carbon monoxide and ethylene prepared with such mixtures are white to light grey whereas such copolymers prepared with Pd(CN)$_2$ are grey to black, water-insoluble solids. Furthermore, the catalyst residues in the polymer are more easily removed when such mixtures are employed than when Pd(CN)$_2$ alone is utilized.

HPd(CN)$_3$, a water-soluble, white solid, was found to be at least three times as active as Pd(CN)$_2$, a yellow, water-insoluble solid, in catalyzing the copolymerization of carbon monoxide and ethylene. It was also discovered that $HPd(CN)_3$ differs from $Pd(CN)_2$ not only in its activity in catalyzing the ethylene-carbon monoxide copolymerization, but also that its use results in increased yield of polymer.

As noted hereinbefore, the present novel compound $HPd(CN)_3$ is an especially suitable catalyst for the preparation of interpolymers of carbon monoxide with at least one ethylenically unsaturated organic compound, preferably an aliphatic monoolefin, and most preferably ethylene. The process for polymerizing carbon monoxide with such ethylenically unsaturated organic compounds is described in detail in copending application Ser. No. 344,679, filed March 26, 1973, now U.S. 3,835,123, issued Sept. 10, 1974.

Briefly, carbon monoxide is reacted with at least one ethylenically unsaturated comonomer in the presence of from 0.001 to 5% by weight of $HPd(CN)_3$ based on the total monomers charged. The polymerization is conducted at temperatures ranging from about 75° to 150°C and pressures from about 25 to 150 atmospheres. An inert diluent may be employed such as the non-polymerizable volatile organic solvents, e.g., esters, ketones, and aliphatic hydrocarbons. The mole ratio of comonomers to carbon monoxide will range from about 1:1 to about 25:1, preferably from about 5:1 to about 20:1.

The following examples are presented in order to illustrate the preparation of $HPd(CN)_3$ and its utility as a catalyst for preparing interpolymers of ethylene and carbon monoxide. It is understood, however, that the examples are for the purpose of illustration only and that the invention is not to be regarded as limited to any of the specific conditions or reactants recited therein. Unless otherwise indicated, parts described in the examples are parts by weight. Pressure measurements are at ambient (room) temperatures.

EXAMPLE I

This example illustrates the preparation of $HPd(CN)_3$ via the $Pd(CN)_2$-aqueous HCN method.

One gram of $Pd(CN)_2$ and 100 ml of a 4%w aqueous solution of HCN were added to a 200 ml tantalum pressure vessel. The $Pd(CN)_2$ turned white and partially dissolved. The vessel was closed and it was heated with agitation for 4 hours at 90°C. The vessel and contents were cooled to room temperature, the vessel opened and the colorless, clear solution was removed. The solution was evaporated to dryness in a rotating evaporator in vacuo (ca 1 mm Hg) at room temperature (22°C). 1.16G of a white, water-soluble residue was obtained, which was handled in a dry box.

Elemental analysis of the residue was consistent with the formula $HPd(CN)_3$ (Found: 19.0% C, 22.4% N, 0.60% H, 57.0% Pd. Calculated for $HPd(CN)_3$ 19.3% c, 22.6% N, 0.54% H, 57.7% Pd). The recovery of product (1.16g) was very close to the theoretical (1.17g). Aqueous solutions of the compound were highly acidic (pKa = 2.3) and potentiometric titrations showed 0.9 to 1.1 protons per palladium.

EXAMPLE II

This example illustrates the preparation of $HPd(CN)_3$ via the ion-exchange method.

1.2 gram of $K_2Pd(CN)_4$ was dissolved in 15 ml of distilled water and 10g of acidic ion exchange resin (Amberlite IR 120H) was added. After stirring for 3 hours, the resin was filtered off and replaced. This was repeated five times. The solution was evaporated to dryness in a rotating evaporator in vacuo at room temperature. A white residue was obtained which weighed 0.77g. It analyzed for 57.3% (theory is 57.7%) and titration with NaOH indicated 1.02 protons per palladium.

EXAMPLE III

This example illustrates the preparation of an ethylenecarbon monoxide copolymer using the instant novel catalyst $HPd(CN)_3$.

Into a 600 ml tantalum reactor was added 0.025g of $HPd(CN)_3$ prepared in Example I, 50 ml of dried cyclohexane, 7g of glass beads, 100 psig of carbon monoxide and 850 psig of ethylene. The reactor and contents were heated at 105°C for 18 hours. After cooling, depressuring, opening the reactor, and separating the beads and solvent, 13.5g of a white polymer powder melting at about 260°C and analyzing for 64.2%w C, 7.2%w H and 28.6%w O were obtained.

Under similar conditions, 0.025g of $HPd(CN)_3$ prepared according to Example II yielded 13.4g of polymer and 0.021 g of $Pd(CN)_2$ yielded 4.7g of medium grey polymer.

EXAMPLE IV

This example illustrates the superiority of $HPd(CN)_3$ over $Pd(CN)_2$ as a catalyst for the copolymerization of ethylene and carbon monoxide.

Into a 600 ml tantalum reactor were placed 7g of glass beads, 50 ml of cyclohexane, 850 psig of ethylene, 100 Psig or carbon monoxide (at 20°C), and various amounts of $Pd(CN)_2$, $HPd(CN)_3$ prepared as in Example I (ex aq HCN) and $HPd(CN)_3$ prepared as in Example II (ex cation exchange resin). The results are as follows:

| Catalyst | Wt. g | Max pressure psig | Time hr. | Temp. °C | Co-polymer g |
|---|---|---|---|---|---|
| $Pd(CN)_2$ | 0.021 | 1620 | 18 | 105 | 4.7 |
| $HPd(CN)_3$ (I.E.) | 0.025 | 1500 | 18 | 105 | 13.4 |
| $HPd(CN)_3$ (aq HCN) | 0.025 | 1550 | 18 | 105 | 13.5 |
| $HPd(CN)_3$ (I.E.) | 0.025 | 1700 | 8 | 115 | 10.8 |
| $HPd(CN)_3$ (aq HCN) | 0.025 | 1725 | 8 | 115 | 11.4 |

The above data clearly illustrate that significant higher yields of copolymer are obtained in a given period of time when the catalyst is $HPd(CN)_3$.

I claim:
1. $HPd(CN)_3$.
2. A process for preparing $HPd(CN)_3$ which comprises:
   1. contacting $Pd(CN)_2$ with an aqueous solution of HCN in stoichiometric excess at a temperature from about 0°C to 100°C.
   2. evaporating the resulting reaction mixture to dryness under reduced pressure at a temperature of from about 0°C to 40°C, and
   3. recovering the resulting white, water-soluble residue.
3. The process as in claim 2 wherein said contacting is performed at a temperature from about 70°C to 90°C to 0.5 to 5 hours.
4. The process as in claim 2 wherein the HCN solution is a 1 to 10% aqueous solution.

5. The process as in claim 2 wherein Pd(CN)$_2$ is contacted with a 200% stoichiometric excess of a 5% solution of HCN for 1 to 3 hours at 70° to 90°C.

6. A process for preparing HPd(CN)$_3$ which comprises:
1. contacting an aqueous solution of K$_2$Pd(CN)$_4$ with an acid type cation exchange resin in the acid form,
2. evaporating the resulting solution to dryness in vacuo at a temperature of from about 0°C to 40°C, and
3. recovering the resulting white, water-soluble residue.

7. The process as in claim 6 wherein a 1 to 25% by weight aqueous solution of K$_2$Pd(CN)$_4$ is employed.

* * * * *